US011427443B2

(12) United States Patent
De Lima et al.

(10) Patent No.: US 11,427,443 B2
(45) Date of Patent: Aug. 30, 2022

(54) LOAD-MOVING EQUIPMENT

(71) Applicants: PORTOCEL—TERMINAL ESPECIALIZADO DE BARRA DO RIACHO S.A., Aracruz (BR); FORTEMAR NAVEGAÇÃO LTDA., Aracruz (BR)

(72) Inventors: Sérgio Luiz De Lima, João Neiva (BR); Agostini Ribeiro, Aracruz (BR)

(73) Assignees: PORTOCEL—TERMINAL ESPECIALIZADO DE BARRA DO RIACHO S.A., Aracruz (BR); FORTEMAR NAVEGAÇÃO LTDA., Aracruz (BR)

( * ) Notice: Subject to any disclaimer, the term of this patent is extended or adjusted under 35 U.S.C. 154(b) by 210 days.

(21) Appl. No.: 16/630,301

(22) PCT Filed: Jul. 10, 2018

(86) PCT No.: PCT/BR2018/050233
§ 371 (c)(1),
(2) Date: Jun. 22, 2020

(87) PCT Pub. No.: WO2019/010556
PCT Pub. Date: Jan. 17, 2019

(65) Prior Publication Data
US 2020/0317475 A1 Oct. 8, 2020

Related U.S. Application Data
(60) Provisional application No. 62/530,562, filed on Jul. 10, 2017.

(51) Int. Cl.
*B66C 1/62* (2006.01)
(52) U.S. Cl.
CPC ..................... *B66C 1/62* (2013.01)

(58) Field of Classification Search
CPC .... B66C 1/62; B66C 1/42; B25J 15/08; B25J 15/0491; B25J 15/0425
(Continued)

(56) References Cited

U.S. PATENT DOCUMENTS 3,655,232 A * 4/1972 Martelee ................ B66C 1/32
294/67.33
4,051,966 A * 10/1977 Cotton .................... B66F 9/183
414/428
(Continued)

FOREIGN PATENT DOCUMENTS

| CN | 201694756 U | 1/2011 |
| CN | 205772754 U | 12/2016 |

(Continued)

OTHER PUBLICATIONS

International Search Report issued for Application No. PCT/BR2018/050233, dated Oct. 10, 2018.
(Continued)

*Primary Examiner* — Paul T Chin
(74) *Attorney, Agent, or Firm* — Meunier Carlin & Curfman LLC

(57) ABSTRACT

The present invention relates to a load handling equipment and, more specifically, to an equipment for handling load bales tied with wire. The equipment of the present invention comprises at least one locating portion (11, 110, 1100), the locating portion (11, 110, 1100) comprising a gripping element (12, 120, 1200) formed by two gripping parts which move away and approximate to get the tie wire, wherein approaching and moving away the gripping parts is accomplished by means of a pneumatic cylinder (14, 140, 1400).

12 Claims, 11 Drawing Sheets

(58) Field of Classification Search
USPC .................. 294/119.1, 82.15, 85, 67.3, 67.33
See application file for complete search history.

(56) References Cited

U.S. PATENT DOCUMENTS

| | | | | |
|---|---|---|---|---|
| 4,252,358 | A | * | 2/1981 | Klebs .................. B66C 1/62 |
| | | | | 294/119.1 |
| 5,997,064 | A | * | 12/1999 | Orita .................. B66C 1/445 |
| | | | | 294/119.1 |
| 2010/0225132 | A1 | * | 9/2010 | Weber ................ B25J 15/0266 |
| | | | | 294/67.33 |
| 2011/0204666 | A1 | * | 8/2011 | Kjol .................... B66C 3/16 |
| | | | | 294/198 |
| 2018/0186608 | A1 | * | 7/2018 | Mancini .............. B66C 1/62 |
| 2019/0010027 | A1 | * | 1/2019 | Taylor ................ B66C 1/62 |

FOREIGN PATENT DOCUMENTS

| | | |
|---|---|---|
| CN | 205973427 U | 2/2017 |
| CN | 106672783 A | 5/2017 |
| CN | 206156585 U | 5/2017 |

OTHER PUBLICATIONS

International Preliminary Report on Patentability issued for Application No. PCT/BR2018/050233, dated Oct. 2, 2019.
Catalogo TWN—Lingas e Acessorios, TWN Engenharia, Consultoria E Construcao LTDA [BR], Jul. 2010, pp. 5-6.

* cited by examiner

LOAD-MOVING EQUIPMENT

The present invention relates to an equipment for handling load and, more specifically, to an equipment for handling load bales tied with wire.

FUNDAMENTALS OF THE INVENTION

Different means of transport for large loads are known in the art. Generally, the load is transported on pallets, containers or bales (blocks of material) which are loaded onto the conveyor using cranes, forklifts with booms or mechanical arms.

Bale handling is particularly complicated: since bales comprise packets of material tied with sturdy wires or strings, the use of mechanical arms and booms directly on the bales is not an efficient solution, especially when loading bales in ship holds, when any structure or equipment used for lifting cannot prevent the arrangement of bales inside the holds of the ships, an activity called stowage.

FIGS. 1 and 2 show the known prior art solution for moving cellulose bales. FIG. 1 shows a set of bales 1 formed by packets grouped and tied by wires 2. The bales 1 are hoisted by a crane 3 with lifting equipment 4 consisting of a series of hooked chains 5. As better illustrated in FIG. 2, the chain hooks 5 must be manually secured to the wires 2 of the bales 1. Thus, it is necessary for operators to climb onto the set of bales to secure the chain hooks 5 to the wires 2.

This type of human intervention, besides generating accident risks and a necessary concern with the ergonomic aspect of the activity, increases the time and cost of the load handling operation.

Objectives of the Invention

In view of the inconveniences cited above and others well known to those skilled in the art, the present invention provides a more efficient and safe solution to load handling.

Thus, a first aspect of the present invention is to provide a load handling equipment that eliminates the need for human intervention for the lifting of load bales.

The present invention also provides a load handling equipment that is capable of engaging the bale tying wires or strings through automated operation.

The load handling equipment of the present invention can be moved by a crane of a known kind in the prior art, so that it is a widely applicable logistic solution.

BRIEF DESCRIPTION OF THE INVENTION

The present invention provides a load handling equipment configured to engage tying means of a load bale. The equipment comprises at least one locating portion comprising at least one gripping part formed by two gripping parts which move away and approach to grip the tying means, wherein the and moving away and the approach of the parts is accomplished by means of a pneumatic cylinder.

In one embodiment of the present invention, each locating portion comprises a structure with two side walls, wherein a gripping part is installed on each side wall of the locating portion. Preferably, each gripping part is arranged on a respective surface of the side wall of the locating portion.

In such embodiment, a first pneumatic cylinder is arranged to drive the first gripping part and a second pneumatic cylinder is arranged to drive the second gripping part.

The equipment may further comprise at least eight parallel beams which are connected to a central beam body extending substantially transverse to the parallel beams, each parallel beam supporting two support structures, each support structure having two locating portions and each locating portion having two gripping parts.

In another embodiment of the invention, the locating portion comprises a first and a second locating portion connected to the pneumatic cylinder, a first gripping part comprising a curved lower projection protruding from the first locating part and a second gripping part comprising a curved lower projection protruding from the second locating part; wherein approaching and moving away the gripping parts is accomplished by approaching and moving away the locating portions.

The equipment may further comprise a support structure comprising a housing portion that protects the locating portion and a vertically protruding column from the housing portion; and a support structure having a tubular element configured to receive the support structure column, wherein sliding the column into the tubular element of the support structure enables a vertical displacement of the housing portion.

In such embodiment, the support structure comprises two columns and the support structure comprises two tubular elements, each of the tubular elements being configured to receive a respective one of the columns. Also, in this embodiment, the pneumatic cylinder is coupled to the first and second locating parts by means of forks.

In a third embodiment, the present invention also contemplates a load handling equipment configured to engage a tying means of a load bale, the equipment comprising at least two parallel beams, which are connected to a central beam body which extends substantially transverse to the parallel beams, wherein each of the parallel beams support two support structures, each support structure comprising a locating portion with one gripping element formed by two gripping parts which approach and move away for gripping the tying means, wherein approaching and moving away the gripping parts is accomplished by means of a pneumatic cylinder.

In one embodiment of the present invention, the locating portion comprises a first and a second locating parts connected to the pneumatic cylinder, a first of the gripping parts comprising a curved lower projection projecting from the first locating part and a second of the gripping parts comprising a curved lower projection protruding from the second locating part; wherein approaching and moving away of the gripping parts is accomplished by approaching and moving away the locating parts.

Each support structure can comprise a housing part which protects the locating portion and a vertically protruding column of the housing portion; wherein the equipment further comprises a support structure coupled to each support structure, each support structure having a tubular element configured to receive a column of a respective support structure, wherein the sliding of the column into the tubular member of the support structure allows vertical displacement of the housing part.

In one embodiment of the present invention, the equipment further comprises a receptacle connected to the housing portion, the receptacle comprising a first receptacle part pivotally coupled to the housing portion to protect the first locating part and a second receptacle part pivotally coupled to the housing part to protect the second gripping part.

BRIEF DESCRIPTION OF THE DRAWINGS

The present invention will hereinafter be described in more detail based on exemplary embodiments shown in the drawings. The figures show.

DETAILED DESCRIPTION OF THE FIGURES

Figure 1:
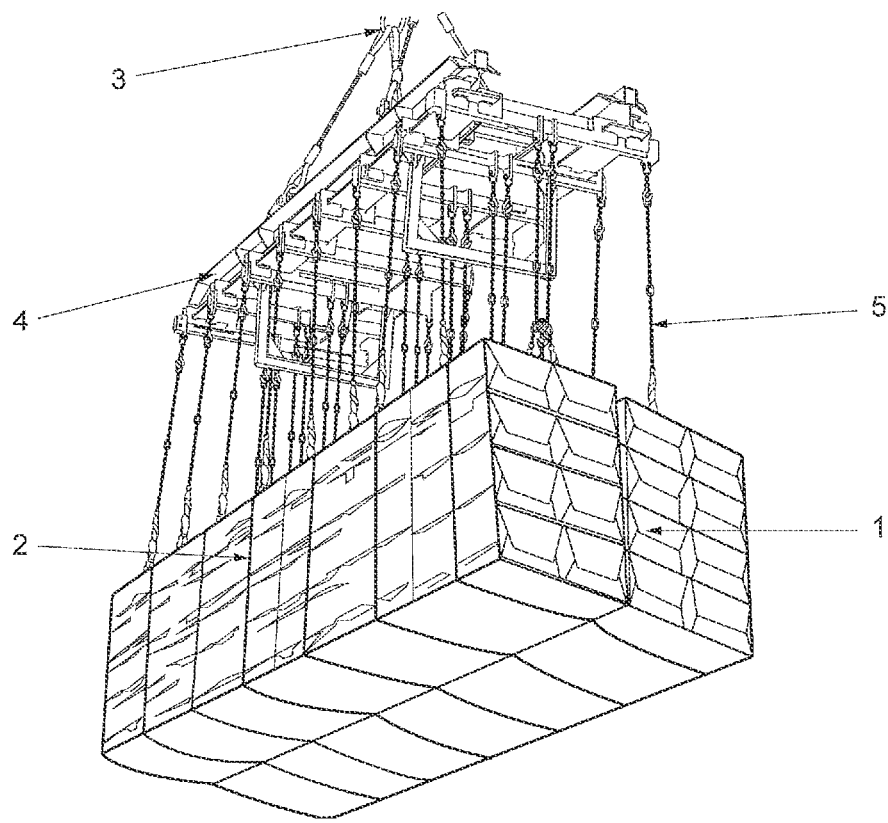
FIG. 1—is an illustration of a prior art known load handling equipment.
Figure 2:
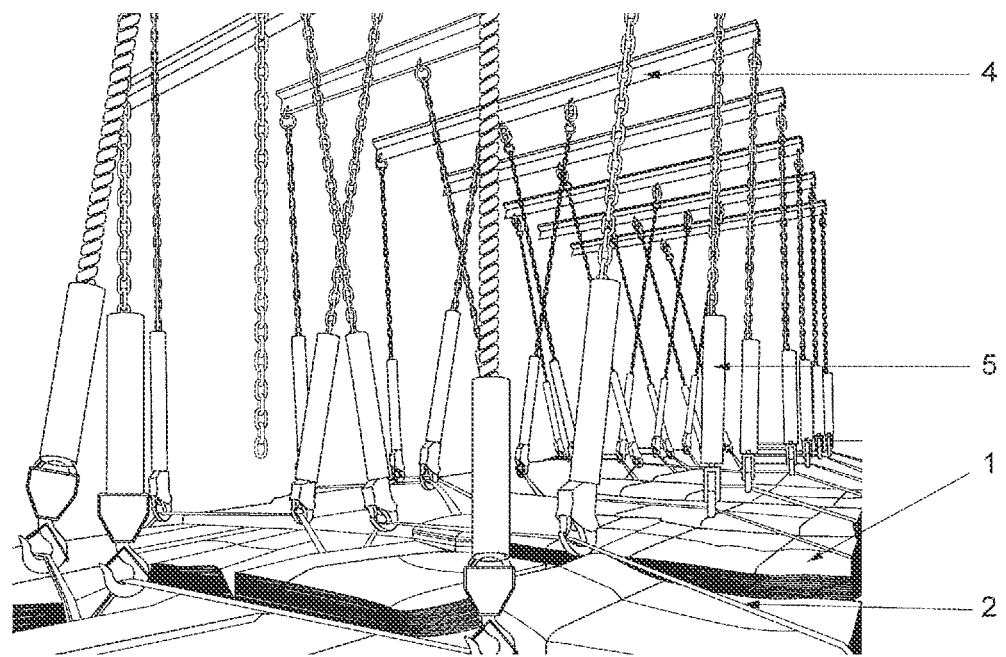
FIG. 2—is an illustration of the manual operation of hooking the prior art known load handling equipment hooks to a bale of material.
Figure 3:
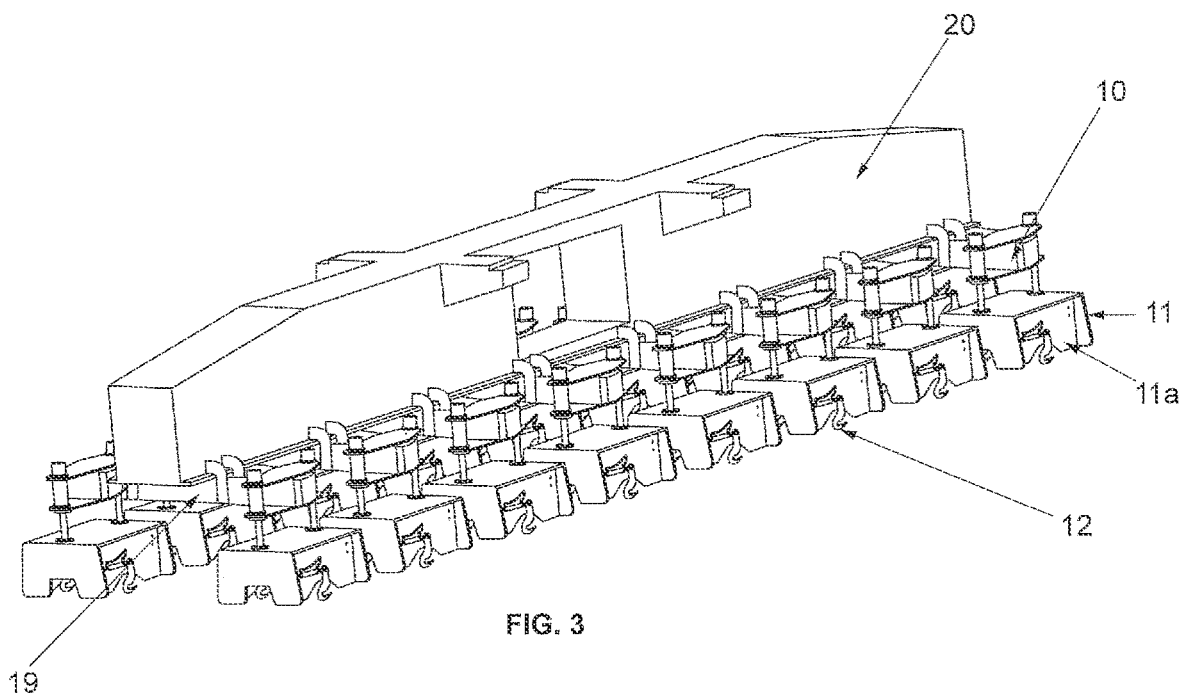
FIG. 3—is a perspective view of the load handling equipment according to a first embodiment of the present invention.
Figure 4:
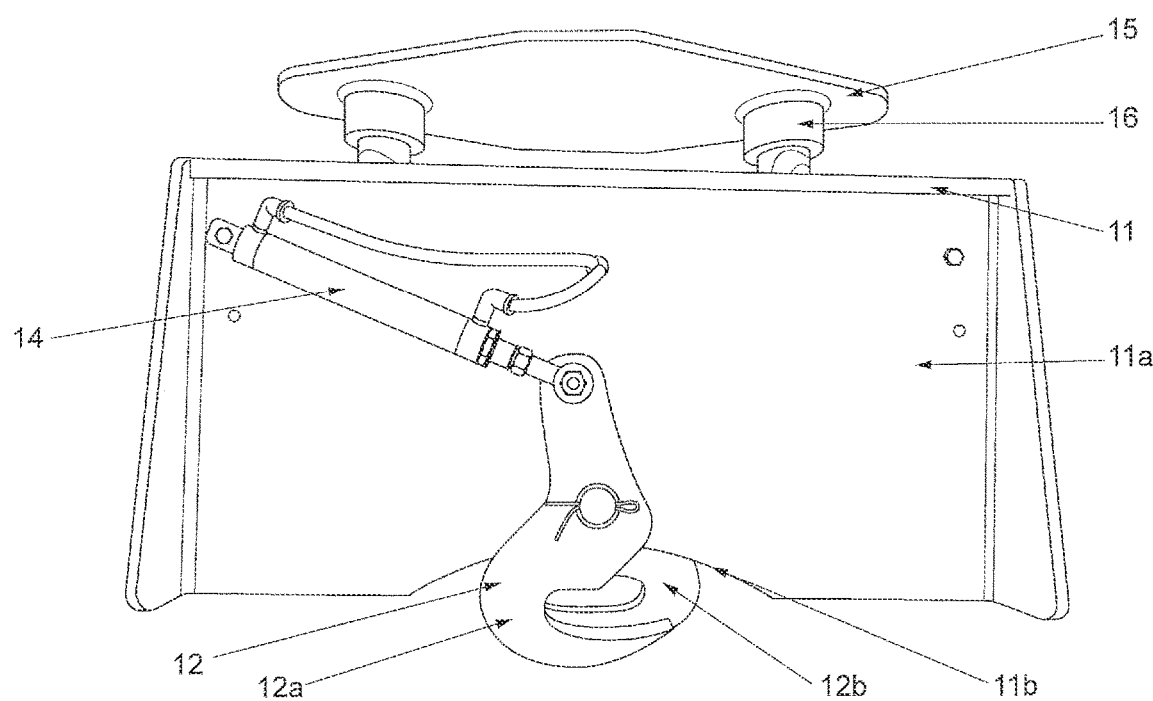
FIG. 4—is an enlarged view of the locating portions of the load handling equipment according to the first embodiment of the present invention.
Figure 5:
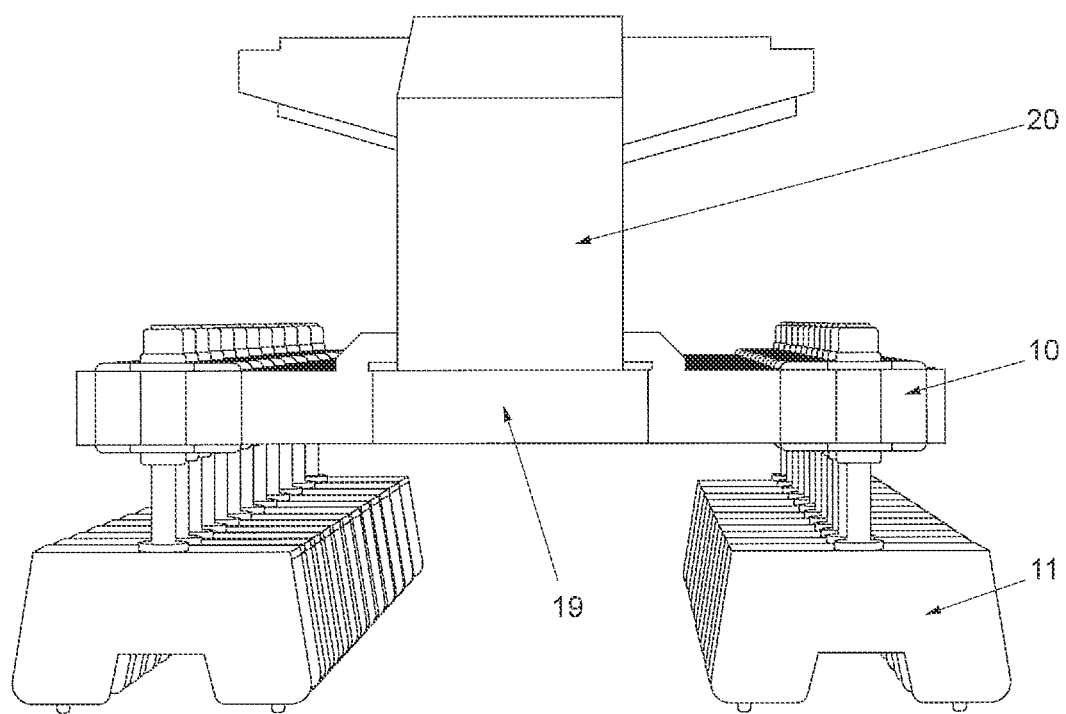
FIG. 5—is a front view of the load handling equipment according to the first embodiment of the present invention.

FIGS. 3 to 5 show a first embodiment of the load handling equipment according to the present invention.

The equipment of the present invention may be used for lifting and moving load bales such as, for example, cellulose bales. Load bales are packets of material that are tied with a tying means such as, for example, steel strings or wires.

In the first embodiment, the equipment comprises a support structure 10 supporting a locating portion 11 with at least one gripping element 12 and at least one pneumatic cylinder 14.

The locating portion 11 comprises a structure with two side walls wherein a gripping element 12 is installed on each side wall 11a of the locating portion 12.

The gripping element 12 is formed by two gripping parts 12a and 12b, and each gripping part 12a and 12b is arranged on a side wall surface 11a of locating portion 12. Thus, as best illustrated in FIG. 4, a first gripping part 12a is disposed on the outer surface of one of the side walls 11a is a second gripping part 12b is disposed on the inner surface of the side wall 11a. In that embodiment, a first pneumatic cylinder 14 is arranged to drive the first gripping part 12a and a second pneumatic cylinder (not shown) is arranged to drive the second gripping part 12b.

As best illustrated in FIG. 4, in the illustrated embodiment of the present invention, each side wall 11a further has a cutout 11b which assists in gripping the tying means.

As best illustrated in FIGS. 3 and 5, in the embodiment of the invention shown in the figures, the equipment comprising at least eight parallel beams 19 which are connected to a central beam body 20 extending substantially transverse to the parallel beams, where each of the parallel beams support two support structures 10, each of the support structures comprising a locating portion 11 with a gripping element 12 formed by two gripping parts 12a, 12b which move apart and move closer together by the action of pneumatic cylinders 14.

The central beam 20 is preferably configured to engage with any type of hoisting equipment such as cranes or arms. Thus, the handling equipment of the present invention can be easily coupled to the handling equipment known in the prior art.

FIG. 4 shows an embodiment where the support structure 10 comprises a housing part 15 and at least one column 16 (in the embodiment shown, the structure 10 comprises two columns 16). Each column 16 is configured to receive a corresponding column from location portion 11, so that location portion 11 can be moved up and down with the column sliding through the column 16 of the structure 10.

For lifting the bale, the central beam 20 is lowered so that the beams 19, support structures 10 and locating portions 11 are also lowered. The gripping parts 12a, 12b are lowered in a separate position, that is, open to each other in an open position. In an open position, the gripping parts are in a higher position than the lower edge of the walls 11a, so that the edges may be at the top of the bale without the gripping parts touching the bale in that moment.

With the equipment lowered, the gripping parts 12a, 12b are driven by the hydraulic cylinders to close, so that they approach each other. As in the first embodiment the gripping parts are in the form of opposite hooks, during the approach the thinner parts of the hooks pass close to the bale and lift the tying means so that it slides over the inner parts of the opposite hooks, being "grabbed" by the gripping parts. At this point, the wire is brought up into the space of cutout 11b of the side wall. Once the corresponding tying means are "grabbed", the equipment can be lifted.

As shown in FIG. 3, in the first embodiment of the present invention the equipment may have sixteen locating elements 11, each having two gripping elements 12 with first and second gripping parts 12a, 12b (one element 12 on each side wall). Thus, the equipment may comprise thirty-two gripping parts engaging tying means of one or more bales.

FIGS. 6 to 11 show a second embodiment of the load handling equipment according to the present invention.

Figure 6:
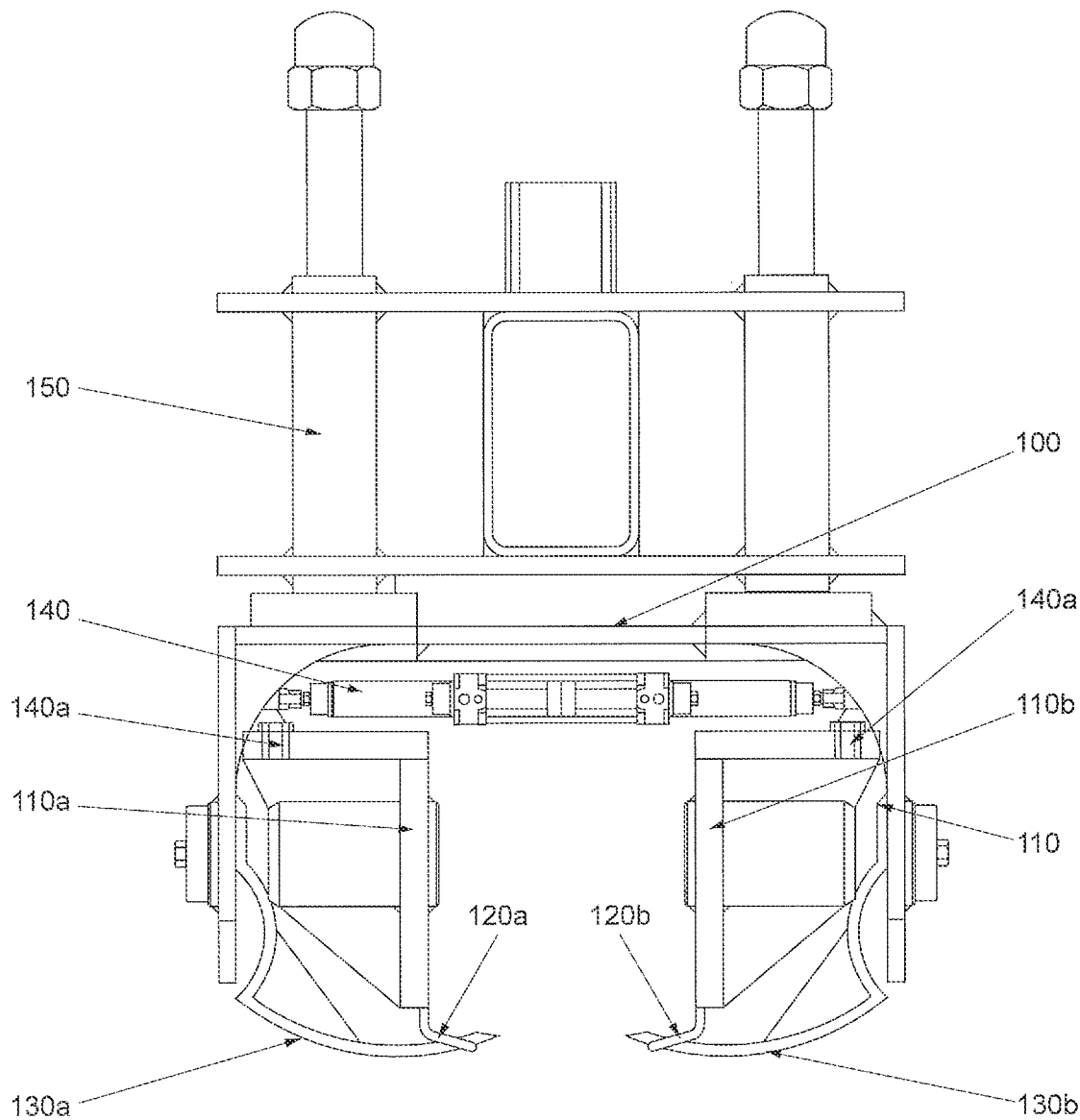
FIG. 6—is a front view of the load handling equipment according to a second embodiment of the present invention.

FIG. 6 shows a front view of the equipment according to a second embodiment of the present invention.

In the second embodiment, the equipment comprises a support structure 100 supporting a locating portion 110 with at least one gripping element 120 and at least one pneumatic cylinder 140.

Figure 7:
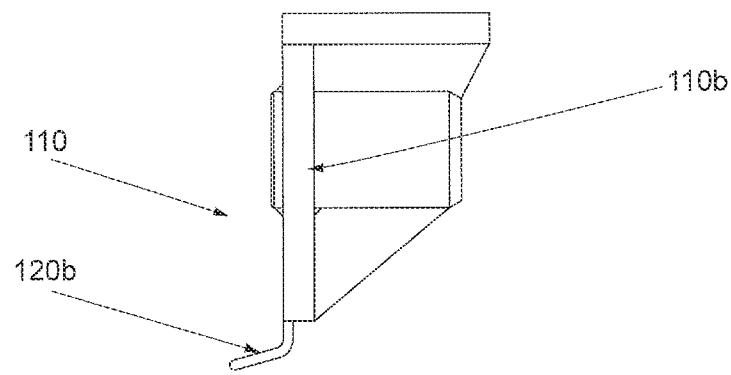
FIG. 7—is a front view of the locating portion of the load handling equipment according to a second embodiment of the present invention.
Figure 8:
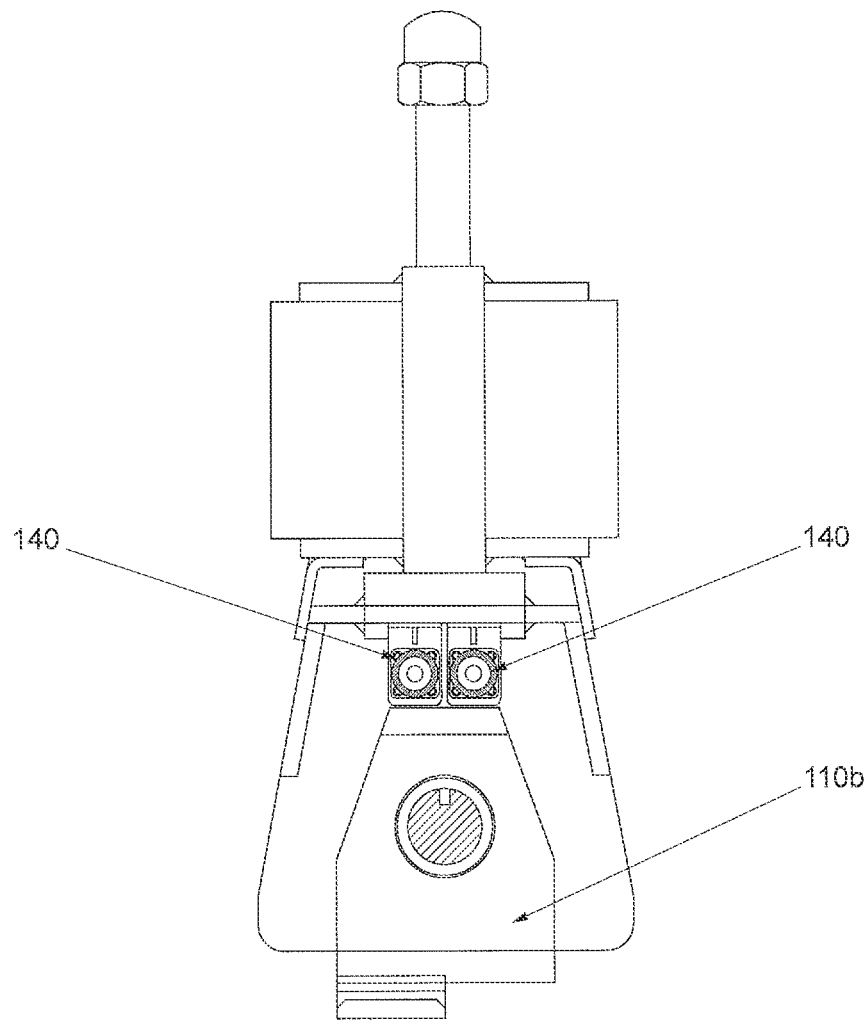
FIG. 8—is a section view AA shown in FIG. 6.

As best illustrated in FIGS. 6 and 7, in this embodiment the locating portion 110 comprises two locating parts 110a and 110b moving under action of the pneumatic cylinder 140. Thus, locating parts move towards each other when driven by the cylinder. As illustrated in FIG. 8, the locating part 110 may comprise two pneumatic cylinders 140 which drive the locating parts 110a and 110b together.

The gripping element 120 is formed by two gripping parts 120a and 120b, each gripping part protruding from one of the locating parts, like a curved wall projecting downwardly toward the other locating part. Thus, when the locating part is moved by the cylinder, the corresponding gripping part is also moved, so that when the locating parts 110a and 110b are close, the two gripping parts 120a, 120b approach to pick up the wires that tie the bales.

Figure 11:
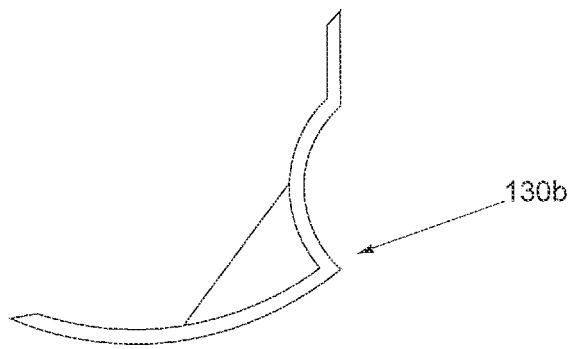
FIG. 11—is a front view of the pusher element of the load handling equipment according to a second embodiment of the present invention.

The locating portion 110 further comprises two pusher elements 130a and 130b (one of which is best illustrated in FIG. 11), which function as spacers, pushing the bale to create a space for the grips to catch the wires.

Figure 9:
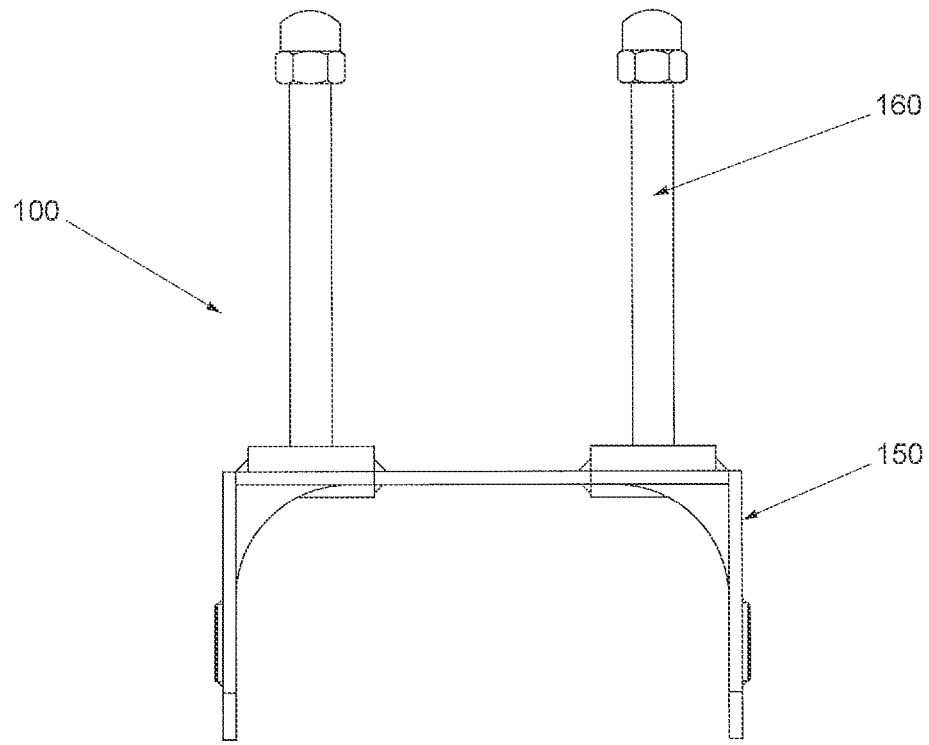
FIG. 9—is a front view of the support structure of the load handling equipment according to a second embodiment of the present invention.

As best illustrated in FIG. 9, in the second embodiment of the present invention, the support structure 100 comprises a housing part 150 and at least one column 160 (in the embodiment shown, the structure 100 comprises two columns 160). In that embodiment, the housing part 150 protects the locating portion 110, acting as a structural cover.

Preferably, the pneumatic cylinder 140 is coupled to the first and second locating parts by means of forks 140a (see FIG. 6).

Figure 10:
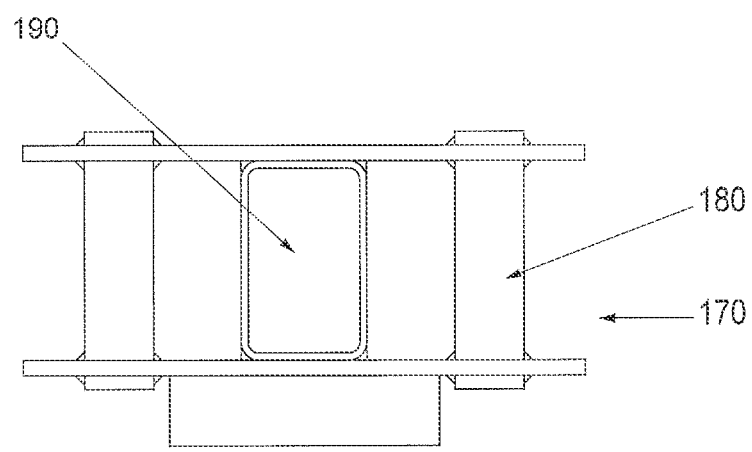
FIG. 10—is a front view of the support structure of the load handling equipment according to a second embodiment of the present invention.

The equipment of the present invention may further comprise a sustaining structure 170, better illustrated in FIGS. 6 and 10. Preferably, the sustaining structure 170 has at least one tubular element 180 which receives the column 160 of the support structure. In the embodiment of the invention shown in FIGS. 6 to 11, the sustaining structure has two tubular elements 180 configured to receive the two columns 160 of the support structure 100. Thus, the support structure 100, and therefore the housing part 150 may be vertically movable with respect to the sustaining structure 170 by sliding the columns 160 along the tubular elements 180.

The sustaining structure may further comprise a beam 190 or other reinforcement element which enables the equipment to be integrated with other equipment or that may support an installation or hoisting structure.

FIGS. 12 to 16 show a third embodiment of the equipment according to the present invention.

Figure 12:
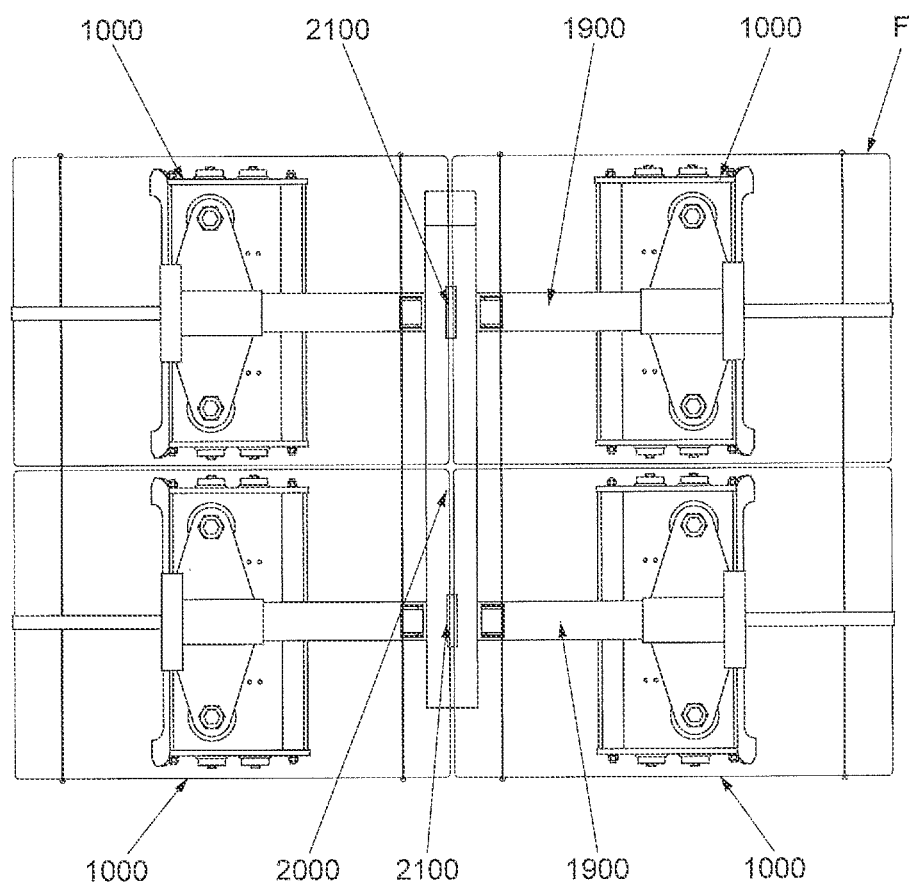
FIG. 12—is a top view of the load handling equipment according to a third embodiment of the present invention.
Figure 13:
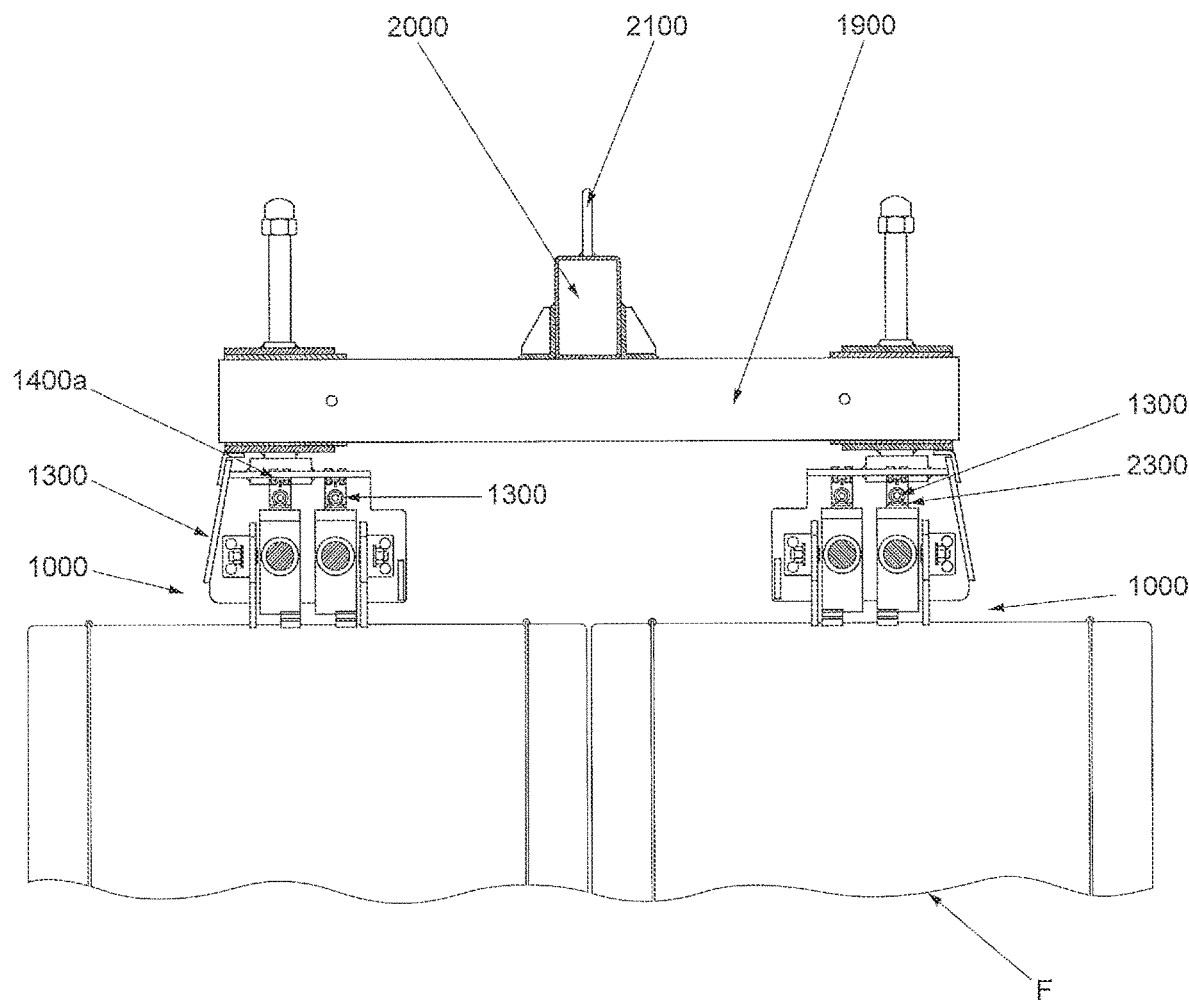
FIG. 13—is a section view AA shown in FIG. 9.

FIG. 12 shows a top view of the equipment according to the third embodiment of the present invention, the equipment being applied to hoist a set of bales F.

In the embodiment shown in FIG. 12, the equipment comprises four sustaining structures 1700 and four support structures 1000 with four locating portions 1100. The equipment further comprises two parallel beams 1900, each beam receiving two sustaining structures 1700. A central beam body 2000 connects the two parallel beams 1900. The central beam 2000 comprises at least one eye 2100 which can be used to engage any type of hoisting equipment such as cranes or arms. Thus, the handling equipment of the present invention can be easily coupled to the lifting equipment known in the prior art.

Figure 16:
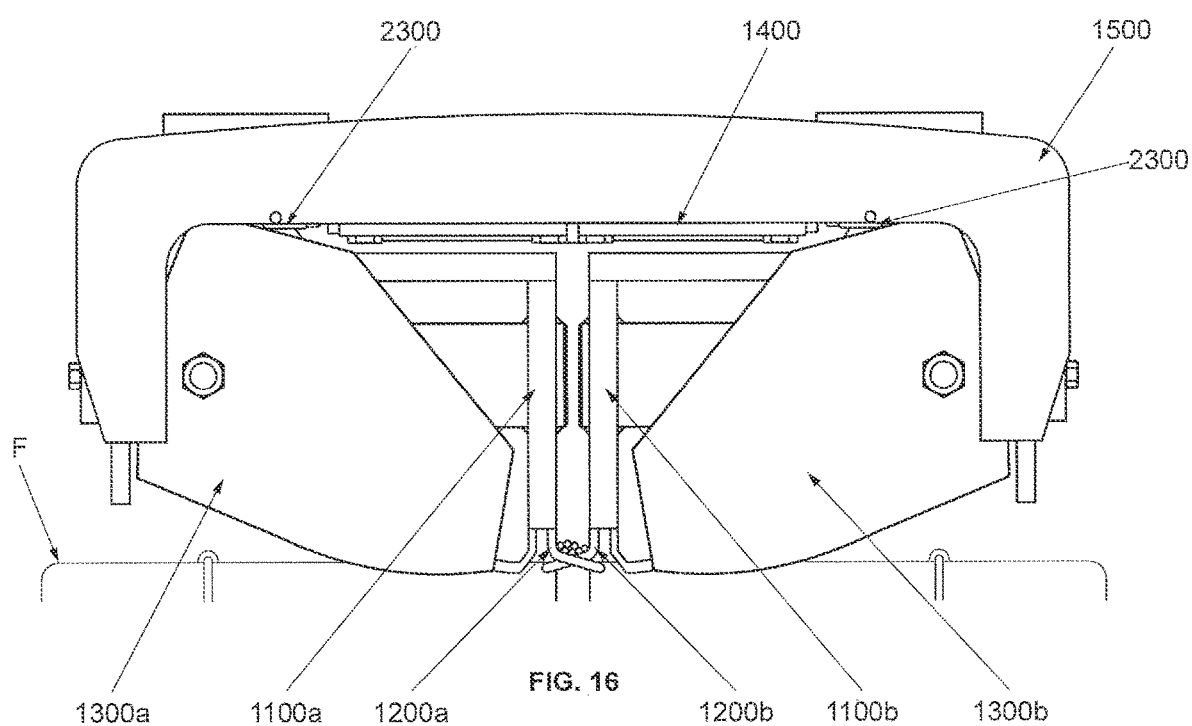
FIG. 16—is an enlarged view of one of the locating portions shown in FIG. 12.

In this embodiment, locating portions 1100 are formed by first and second locating parts 1100a and 1100b which are driven for opening and closing by means of a pneumatic system (see FIG. 16).

Figure 14:
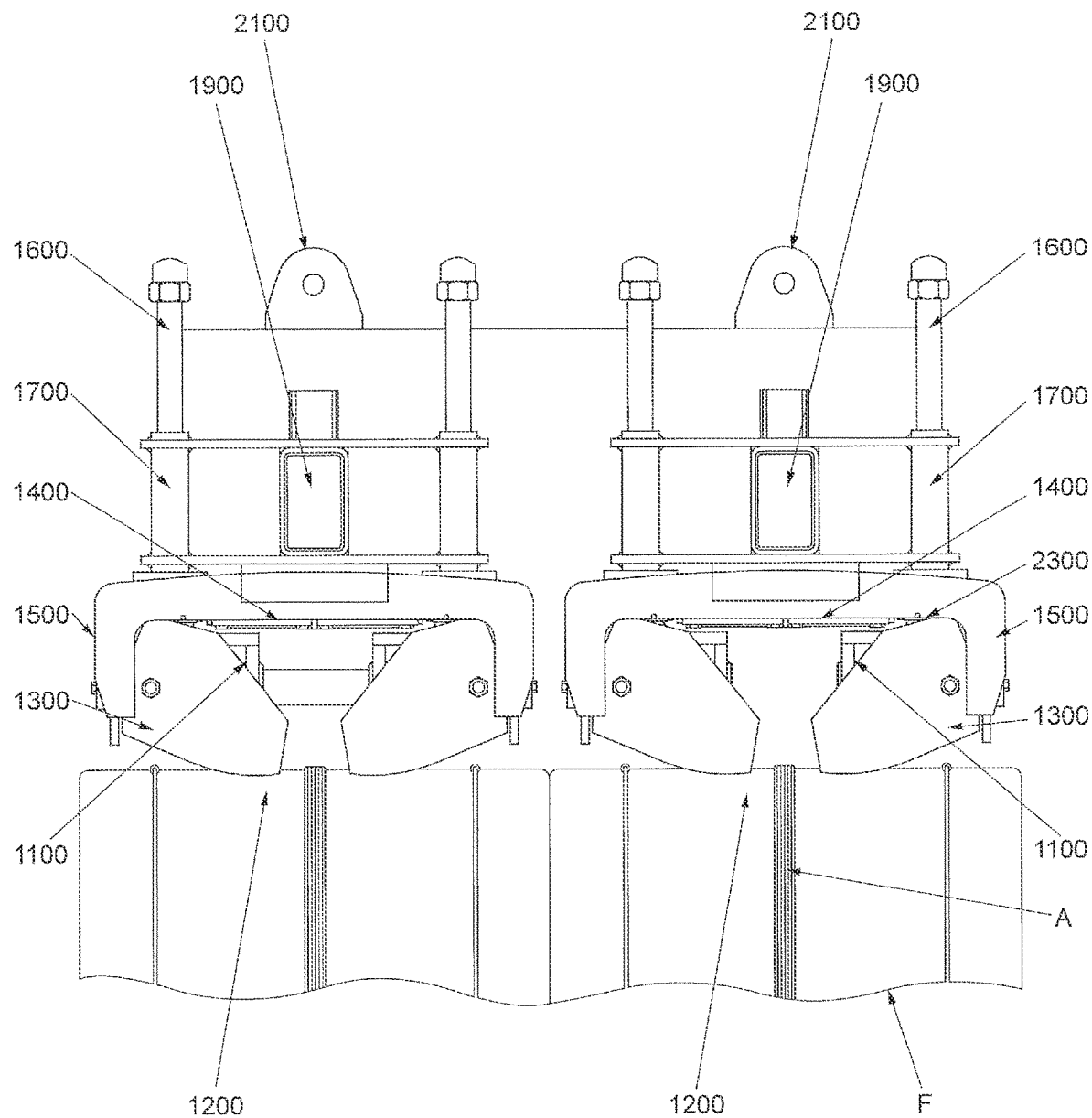
FIG. 14—is a section view BB shown in FIG. 9, where the equipment is shown with the location portions open.
Figure 15:
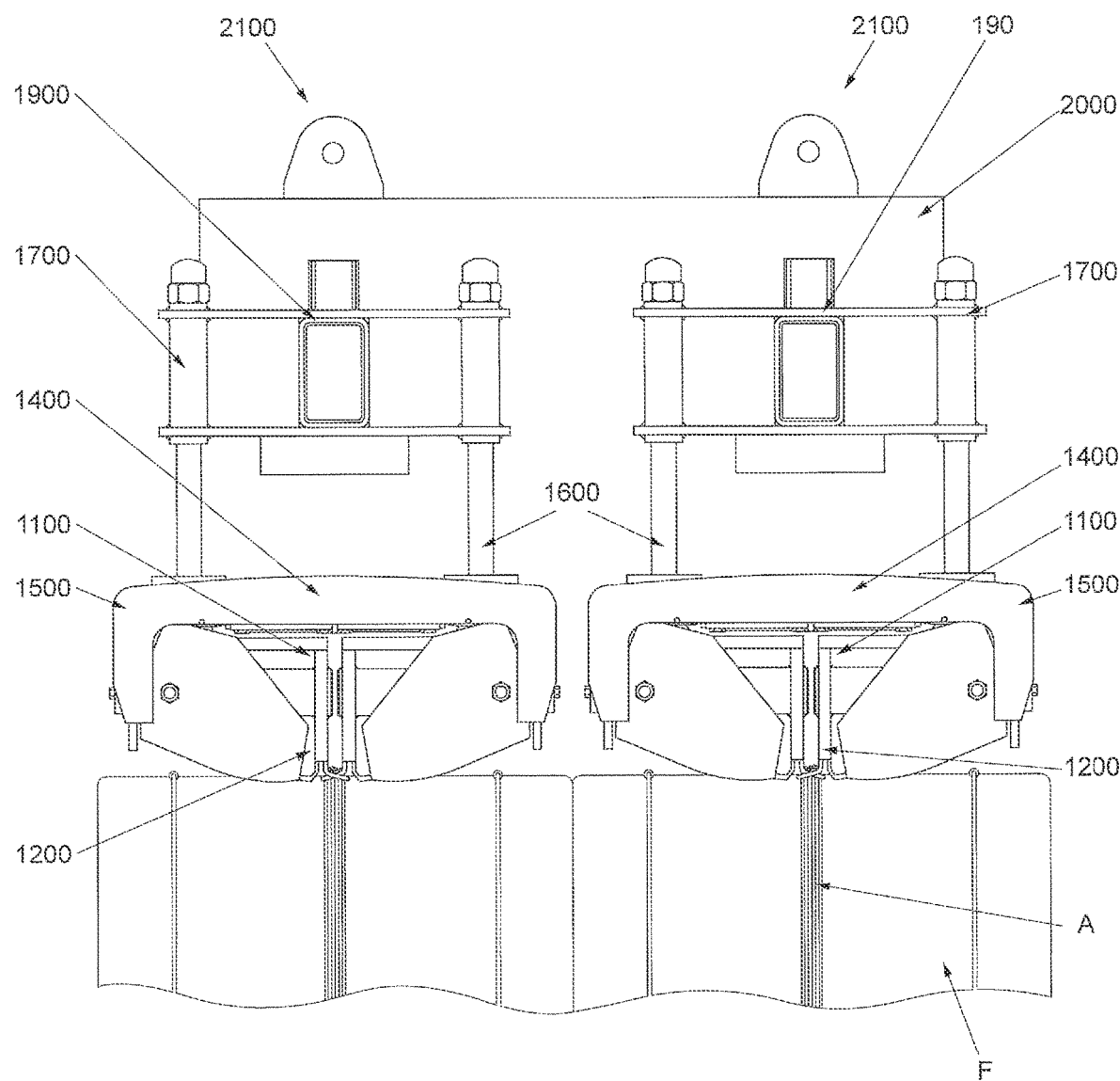
FIG. 15—is a section view BB shown in FIG. 9, where the equipment is shown with the location portions closed.

As best illustrated in FIGS. 14 to 16, each of the locating portions 1100 comprises a gripping element 1200 formed by two gripping parts 1200a and 1200b which move away and approach each other to grip the wire A which ties the bales. Approaching and moving away the gripping parts 1200a, 1200b is accomplished by means of a pneumatic cylinder 1400 which approaches and moves away the locating parts 1100a and 1100b. Preferably, the gripping parts 1200a, 1200b comprise curved lower projections protruding from the location parts 1100a and 1100b. These projections, which protrude toward each other, act as a kind of hook for lifting the wire A and directing it between locating parts 1100a and 1100b (see FIG. 16).

As best seen in FIGS. 14 and 15, each support structure 1000 comprises a housing part 1500 and two vertical columns 1600 and each sustaining structure 1700 comprises two tubular elements which receive the vertical columns 1600, so that the height of the housing part 1500 housing can be selectively adjustable.

A receptacle 1300 for the locating parts 1100a and 1100b is connected to the housing part 1500. As best illustrated in FIGS. 14 to 16, the receptacle preferably comprises a first receptacle part 1300a hingedly coupled to the housing part to protect the first locating part 1000a and a second receptacle part 1300b hingedly coupled to the housing part to protect the second gripping part 1100b.

The pneumatic cylinder 1400 is coupled to the housing by means of a bracket 1400a (see FIG. 13) and coupled to the first and second locating parts by means of forks 2300 (see FIG. 16).

The load handling equipment of the present invention weighs up to about 6 tons and is capable of supporting a load of up to about 32 tons. In addition, the loading elements can be driven (closed or open) by the load handling crane operator or the ship overhead crane operator.

Thus, having described examples of embodiments of the present invention, it should be understood that the scope of the present invention encompasses other possible variations and is limited only by the content of the appended claims, including the possible equivalents thereof.

The invention claimed is:

1. Load handling equipment configured to engage a tying means of a load bale, wherein the load handling equipment comprises:
   at least one locating portion comprising at least one gripping element formed by two gripping parts which move away and approach each other for gripping the tying means, wherein the approaching and moving away of the gripping parts is accomplished by means of at least one pneumatic cylinder, the locating portion further comprising a housing portion that protects the locating portion and a projecting column that projects vertically from the housing portion; and
   a sustaining structure having a tubular element configured to receive the projecting column of the support structure,
   wherein sliding the projecting column into the tubular element of the sustaining structure allows the vertical displacement of the housing portion.

2. The load handling equipment according to claim 1, wherein each locating portion comprises a structure with two side walls, wherein the gripping element is installed in each side wall of the locating portion.

3. The load handling equipment according to claim 2, wherein each gripping part is arranged on a respective side wall surface of the locating portion.

4. The load handling equipment according to claim 3, wherein a first pneumatic cylinder is arranged to drive the first gripping part and a second pneumatic cylinder is arranged to drive the second gripping part.

5. The load handling equipment according to claim 4, wherein the equipment comprises at least eight parallel beams which are connected to a central beam body extending substantially transverse to the parallel beams, each parallel beam supporting two support structures, each support structure having two locating portions and each locating portion having two gripping parts.

6. The load handling equipment according to claim 3, wherein the equipment comprises at least eight parallel beams which are connected to a central beam body extending substantially transverse to the parallel beams, each parallel beam supporting two support structures, each support structure having two locating portions and each locating portion having two gripping parts.

7. The load handling equipment according to claim 2, wherein the equipment comprises at least eight parallel beams which are connected to a central beam body extending substantially transverse to the parallel beams, each parallel beam supporting two support structures, each support structure having two locating portions and each locating portion having two gripping parts.

8. The load handling equipment according to claim 1, wherein each locating portion comprises a first locating part and a second locating part connected to a pneumatic cylinder, a first gripping part comprising a curved lower projection protruding from the first locating part and a second gripping part comprising a curved lower projection protruding from the second locating part; wherein the approaching and moving away of the gripping parts is accomplished by approaching and moving away the locating parts.

9. The load handling equipment according to claim 1, wherein the locating portion comprises two columns and the sustaining structure comprises two tubular elements, each of the tubular elements being configured to receive a respective column.

10. The load handling equipment according to claim 9, wherein the sustaining structure is coupled to each support structure.

11. The load handling equipment according to claim 10, wherein the equipment further comprises a receptacle connected to the housing portion, the receptacle comprising a first receptacle part hingedly coupled to the housing portion to protect the first locating portion and a second receptacle part hingedly coupled to the housing portion to protect the second gripping part.

12. The load handling equipment according to claim 1, wherein the equipment comprises at least eight parallel beams which are connected to a central beam body extending substantially transverse to the parallel beams, each parallel beam supporting two support structures, each support structure having two locating portions and each locating portion having two gripping parts.

* * * * *